United States Patent
Zou et al.

(10) Patent No.: US 11,496,829 B2
(45) Date of Patent: Nov. 8, 2022

(54) CHARGE PUMP AND MICROPHONE CIRCUIT ARRANGEMENT

(71) Applicant: TDK Corporation, Tokyo (JP)

(72) Inventors: Lei Zou, Langhus (NO); Gino Rocca, Copenhagen (DK); Pirmin Hermann Otto Rombach, Kongens Lyngby (DK)

(73) Assignee: TDK Corporation, Tokyo (JP)

( * ) Notice: Subject to any disclaimer, the term of this patent is extended or adjusted under 35 U.S.C. 154(b) by 183 days.

(21) Appl. No.: 16/765,497

(22) PCT Filed: Nov. 20, 2018

(86) PCT No.: PCT/EP2018/081893
§ 371 (c)(1),
(2) Date: May 20, 2020

(87) PCT Pub. No.: WO2019/097077
PCT Pub. Date: May 23, 2019

(65) Prior Publication Data
US 2020/0322721 A1 Oct. 8, 2020

(30) Foreign Application Priority Data
Nov. 20, 2017 (DE) .......................... 102017127308.5

(51) Int. Cl.
*H04R 3/00* (2006.01)
*H02M 3/07* (2006.01)
*H04R 19/04* (2006.01)

(52) U.S. Cl.
CPC ............. *H04R 3/00* (2013.01); *H02M 3/073* (2013.01); *H04R 19/04* (2013.01); *H02M 3/075* (2021.05); *H04R 2201/003* (2013.01)

(58) Field of Classification Search
CPC ..... H04R 3/00; H04R 19/04; H04R 2201/003
(Continued)

(56) References Cited

U.S. PATENT DOCUMENTS 9,281,744 B2 * 3/2016 Kropfitsch ............ H02M 3/073
9,743,196 B2 * 8/2017 Kropfitsch ............ H04R 19/04
(Continued)

FOREIGN PATENT DOCUMENTS

DE   102012101285 A1   8/2012
DE   102013207975 A1   10/2013
(Continued)

OTHER PUBLICATIONS

US 8,797,090 B1, 08/2014, Shaeffer (withdrawn)
(Continued)

*Primary Examiner* — Disler Paul
(74) *Attorney, Agent, or Firm* — Nixon Peabody LLP

(57) ABSTRACT

A charge pump having an input section, and first and second output charge pump sections. The input section includes an input and output node and N input charge pump cells arranged between the input and output nodes. The first output charge pump section includes a first input and output node and M first charge pump cells arranged between the first input and output nodes. The second output charge pump section includes a second input and output node and K second charge pump cells arranged between the second input and output nodes (M, N, K: any integer≥1). The output node of the input charge pump section is coupled with the first input node of the first output charge pump section and with the second input node of the second output charge pump section. The charge pump is configured to provide a first output voltage on the first output node and a second output voltage on the second output node.

11 Claims, 5 Drawing Sheets

(58) Field of Classification Search
USPC .................. 381/91–92, 122–123, 111, 113
See application file for complete search history.

(56) References Cited

U.S. PATENT DOCUMENTS

| | | | |
|---|---|---|---|
| 10,177,653 B2 * | 1/2019 | Sassene | H04R 3/00 |
| 10,222,407 B2 * | 3/2019 | Steiner | H04R 19/04 |
| 10,757,504 B2 * | 8/2020 | Onishi | H04R 19/005 |
| 10,823,774 B2 * | 11/2020 | Steiner | G01R 27/2605 |
| 2008/0018383 A1 | 1/2008 | Conte | |
| 2008/0205134 A1 | 8/2008 | Kato | |
| 2012/0217171 A1 | 8/2012 | Wurzinger et al. | |
| 2013/0093503 A1 | 4/2013 | Kok et al. | |
| 2014/0270262 A1 | 9/2014 | Zeleznik | |
| 2015/0016635 A1 | 1/2015 | Haas-Christensen et al. | |
| 2017/0150262 A1 | 5/2017 | Zeleznik | |
| 2017/0318395 A1 | 11/2017 | Harney | |

FOREIGN PATENT DOCUMENTS

| | | |
|---|---|---|
| DE | 112012005578 T5 | 8/2015 |
| DE | 112011105008 B4 | 10/2017 |
| WO | WO 2009/094749 A1 | 8/2009 |
| WO | WO 2013/083203 A1 | 6/2013 |
| WO | WO 2013/102499 A1 | 7/2013 |

OTHER PUBLICATIONS

Citakovic, J. et al., "A compact CMOS MEMS microphone with 66dB SNR—Visual Supplement," 2009 IEEE International Solid-State Circuits Conference, pp. 1-20, 2009.

Citakovic, J. et al., "A compact CMOS MEMS microphone with 66dB SNR," IEEE International Solid-State Circuits Conference—Digest of Technical Papers, pp. 350-351, 351a, 2009.

International Search Report and Written Opinion in International Application No. PCT/EP2018/081893, dated May 23, 2019 (12 pages).

* cited by examiner

CHARGE PUMP AND MICROPHONE CIRCUIT ARRANGEMENT

CROSS-REFERENCE TO RELATED APPLICATIONS

This application is a U.S. National Stage of International Application No. PCT/EP2018/081893, filed Nov. 20, 2018, which claims the benefit of Germany Patent Application No. 102017127308.5, filed Nov. 20, 2017, both of which are incorporated herein by reference in their entireties.

The present invention relates to a charge pump, in particular to a high voltage charge pump for biasing a double backplate micro-electro-mechanical systems device or a double membrane micro-electro-mechanical systems device, and a microphone circuit arrangement comprising the charge pump.

Condenser microphones such as single or double backplate micro-electro-mechanical systems devices (MEMS devices) need high voltage charge pumps. For double backplate MEMS microphones or double membrane MEMS microphones normally two different bias voltages are provided by two different charge pumps to bias each plate individually to obtain a sufficient signal-to-noise ratio (SNR). However, realizing two charge pumps on a chip causes high area costs.

The object of the invention is to provide a flexible charge pump for biasing a double backplate or double membrane micro-electro-mechanical systems device with reduced area costs.

This object is achieved by the features of the independent claims. Advantageous embodiments of the invention are given in the sub-claims.

According to a first aspect, the invention is distinguished by a charge pump, in particular a high voltage charge pump for biasing a double backplate or double membrane micro-electro-mechanical systems device. The charge pump comprises an input charge pump section, a first output charge pump section and a second output charge pump section. The input charge pump section comprises an input node, an output node and N input charge pump cells, which are arranged between the input node and the output node and where N is any positive integer≥1. The first output pump charge section comprises a first input node, a first output node and M first charge pump cells, which are arranged between the first input node and the first output node and where M is any positive integer≥1. The second output charge pump section comprises a second input node, a second output node and K second charge pump cells, which are arranged between the second input node and the second output node and where K is any positive integer≥1. The output node of the input charge pump section is coupled with the first input node of the first output charge pump section and with the second input node of the second output charge pump section. The charge pump is configured to provide a first output voltage on the first output node and a second output voltage on the second output node, wherein the second output voltage comprises the same polarity as the first output voltage.

Advantageously, by such an arrangement area costs might be reduced because the input charge pump cells of the input charge pump section are used for both generation of the first output voltage and generation of the second output voltage. In comparison, if two single high voltage output charge pumps are used, which is typically done in the art, much higher area costs for two individual high voltage charge pumps are involved.

According to an embodiment of the first aspect, the input charge pump cells of the input charge pump section and/or the first charge pump cells of the first output charge pump section and/or the second charge pump cells of the second output charge pump section are coupled in series. This allows a very compact structure of the charge pump and therefore a simple and cost-effective manufacture.

According to a further embodiment of the first aspect, a number of active charge pump cells in the input charge pump section and/or in the first output charge pump section and/or in the second output charge pump section is adjustable, wherein an active charge pump cell is a charge pump cell which provides an output signal that is different from its input signal. In particular the charge pump may be controlled by a controller allowing to adjust the number of active charge pump cells by a program. As an amplitude of the first output voltage depends on the number of the active charge pump cells in the input charge pump section and the first output charge pump section, the amplitude of the first output voltage can be easily adjusted, for example by a program. Furthermore, the second output voltage can be easily adjusted.

According to a further embodiment of the first aspect, the charge pump comprises at least one switch for bypassing at least one of the input charge pump cells and/or of the first charge pump cells and/or the second charge pump cells. Advantageously, in this way the amplitudes of the first and the second output voltages can be easily adjusted.

According to a further embodiment of the first aspect, the switch or the switches is/are arranged in pre-defined charge pump cells. In particular it is possible that each charge pump cell of the charge pump comprises such a switch. Thus, the first and second output voltages can be easily programmed.

According to a further embodiment of the first aspect, the input charge pump cells and/or the first charge pump cells and/or the second charge pump cells are each driven by at least one clock signal, whose amplitude is adjustable. In particular the amplitude of the at least one clock signal is programmable. As the amplitudes of the first and the second output voltages depend on the amplitude of the at least one clock signal, the amplitudes of the first and second output voltages can be easily adjusted and programmed, respectively.

According to a further embodiment of the first aspect, the input charge pump cells and/or the first charge pump cells and/or the second charge pump cells are each driven by two non-overlapping clock signals. In this way leakage current may be avoided.

According to a further embodiment of the first aspect, the input charge pump cells and the first charge pump cells are driven by a first and a second clock signal, and the second charge pump cells are driven by a third and fourth clock signal. Using different clock signals for the charge pump cells of the first and second output charge pump sections, respectively, allows for a higher flexibility of adjusting the amplitudes of the first and second output voltages.

According to a further embodiment of the first aspect, the first and the second clock signals comprise a first frequency and a first amplitude, and the third and fourth clock signals comprise the first frequency and a second amplitude. Using the same frequency provides the advantage that the clock generation can be easily implanted with low hardware cost, for example, only one ring oscillator with one predefined oscillating frequency may be used to generate the frequency signals for the respective clock signals.

According to a further embodiment of the first aspect, the input charge pump cells and the first charge pump cells comprise an identical circuit structure. Alternatively or additionally the input charge pump cells and the second charge pump cells comprise an identical circuit structure. This allows for a simple and cost-effective manufacture of the charge pump. In addition, the input charge pump cells and the first charge pump cells and/or the second charge pump cells comprise an identical circuit dimensioning.

According to a second aspect, the invention is distinguished by a microphone circuit arrangement comprising a first backplate, a second backplate, a membrane and a charge pump according to the first aspect. The membrane is arranged between the first backplate and the second backplate. The first backplate and the second backplate are each configured to convert an acoustical signal into an electrical signal. The first backplate is electrically coupled to the first output voltage of the charge pump, and the second backplate is electrically coupled to the second output voltage of the charge pump. Alternatively the microphone circuit arrangement comprises a first membrane, a second membrane, a backplate and a charge pump according to the first aspect. The backplate is arranged between the first membrane and the second membrane. The backplate is configured to convert an acoustical signal into an electrical signal. The first membrane is electrically coupled to the first output voltage of the charge pump, and the second membrane is electrically coupled to the second output voltage of the charge pump.

Advantageously, the first and second output voltages of the charge pump can be easily adjusted. In this way signal levels generated by the first backplate and the second backplate respectively the backplate can be fine-tuned in an easy way. This is an advantage for reaching a specified Total Harmonic Distortion (THD) and/or sensitivity of the microphone in view of non-ideal characteristics and asymmetry of the resulting capacitances of the first and second backplates and the first and second membrane, respectively.

According to an embodiment of the second aspect, the first backplate, respectively the first membrane, is biased by the first output voltage via a first resistive element, and the second backplate, respectively the second membrane, is biased by the second output voltage via a second resistive element.

In the present disclosure several aspects of one invention are described. All characteristics that are disclosed with respect to charge pump are correspondingly also disclosed with respect to the other aspects, even if the respective characteristic is not mentioned explicitly in the context of the other aspects.

Furthermore, the description of the subject-matters described herein is not limited to the individual special embodiments. The features of the individual embodiments may—where technically reasonable—rather be combined with each other.

Exemplary embodiments of the invention are explained in the following with the aid of schematic drawings. These are as follows:

Elements of the same design and function that appear in different figures are identified by the same reference numerals.

FIG. 1a shows an equivalent circuit diagram of an exemplary embodiment of a microphone circuit arrangement DBM, in particular a micro-electro-mechanical systems (MEMS) microphone circuit arrangement.

The microphone circuit arrangement DBM comprises a first backplate BP1 and a second backplate BP2. A membrane M is arranged between the first backplate BP1 and the second backplate BP2. In this embodiment the membrane M is for example electrically coupled to or directly connected with ground GND, in particular ac-ground.

The first backplate BP1 and the second backplate BP2 are for example each configured to be electrically coupled or directly connected to a first input port and a second input port of an amplifier, respectively. The first backplate BP1 and the membrane M establish the electrodes of a first capacitor C1. The membrane M and the second backplate BP2 establish the electrodes of a second capacitor C2. The first capacitor C1 and the second capacitor C2 are connected in series. The first and the second capacitors C1, C2 comprise a variable capacity value. Thus, the series connection of the first capacitor C1 and the second capacitor C2 establishes a capacitance element comprising a variable capacity value where the capacity value varies in time depending on the received sound pressure.

The microphone circuit arrangement DBM comprises a high voltage (HV) charge pump CP which provides at least a first output voltage Vout1 and a second output voltage Vout2, wherein the first output voltage Vout1 and the second output voltage Vout2 comprise the same polarity. Preferably, the HV charge pump is a double-output HV charge pump providing the first output voltage Vout1 and the second output voltage Vout2 with a positive voltage.

The first backplate BP1 and the second backplate BP2 are configured to convert an acoustical signal into an electrical signal. As the first capacitor C1 and the second capacitor C2 comprise a non-ideal characteristic and asymmetry, two different bias voltages to bias the first backplate BP1 and the second backplate BP2, respectively, are desired.

The first backplate BP1 is electrically coupled to a first output node VOUT1 of the HV charge pump providing the first output voltage. Preferably the first backplate BP1 is biased by the first output voltage Vout1 via a first resistive element R1.

The second backplate BP2 is electrically coupled to a second output node VOUT2 of the HV charge pump providing the second output voltage Vout2. Preferably the second backplate BP2 is biased by the second output voltage Vout 2 via a second resistive element R2.

Figure 1A:
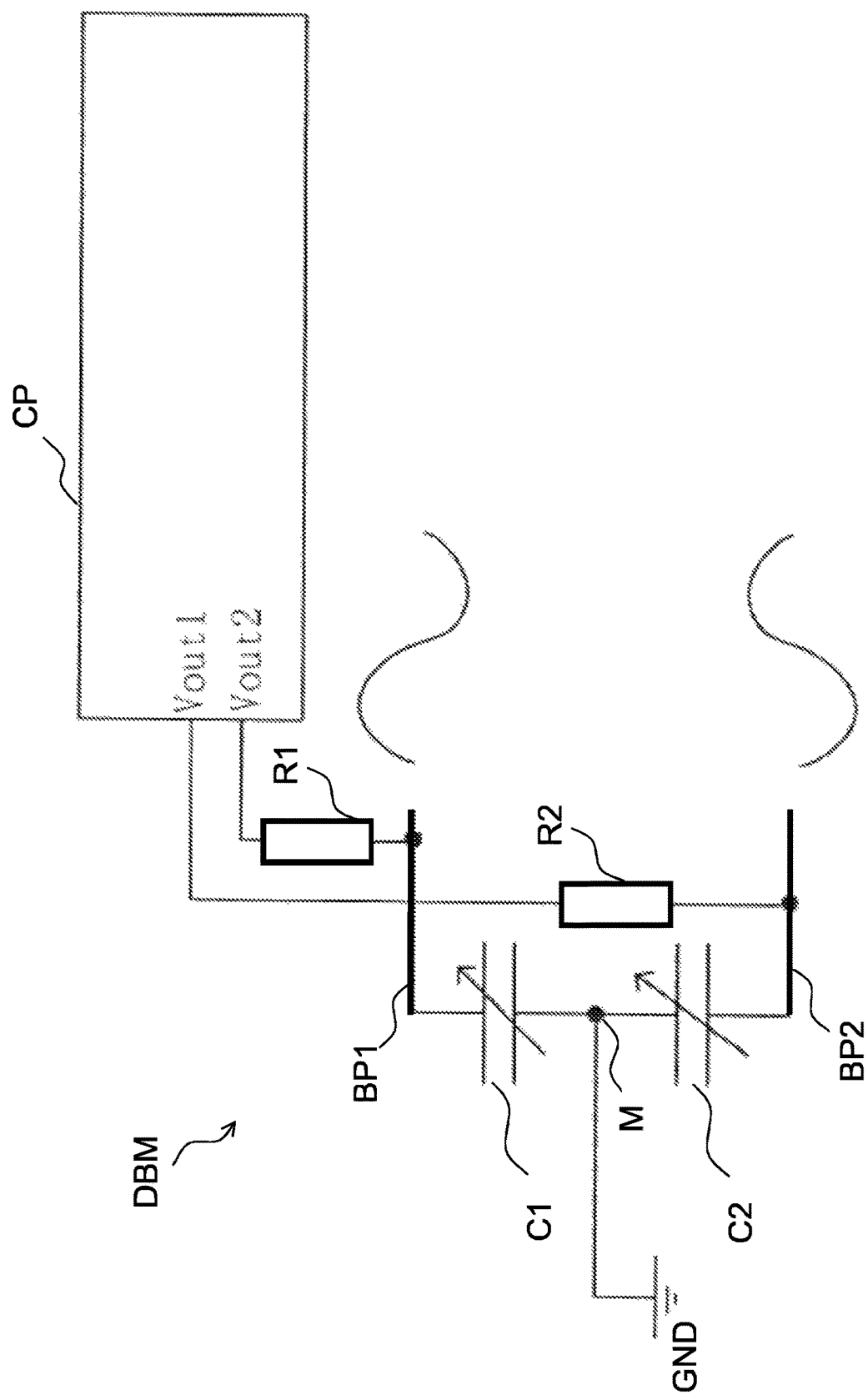
FIG. 1a shows an equivalent circuit diagram of an exemplary embodiment of a microphone circuit arrangement.
Figure 1B:
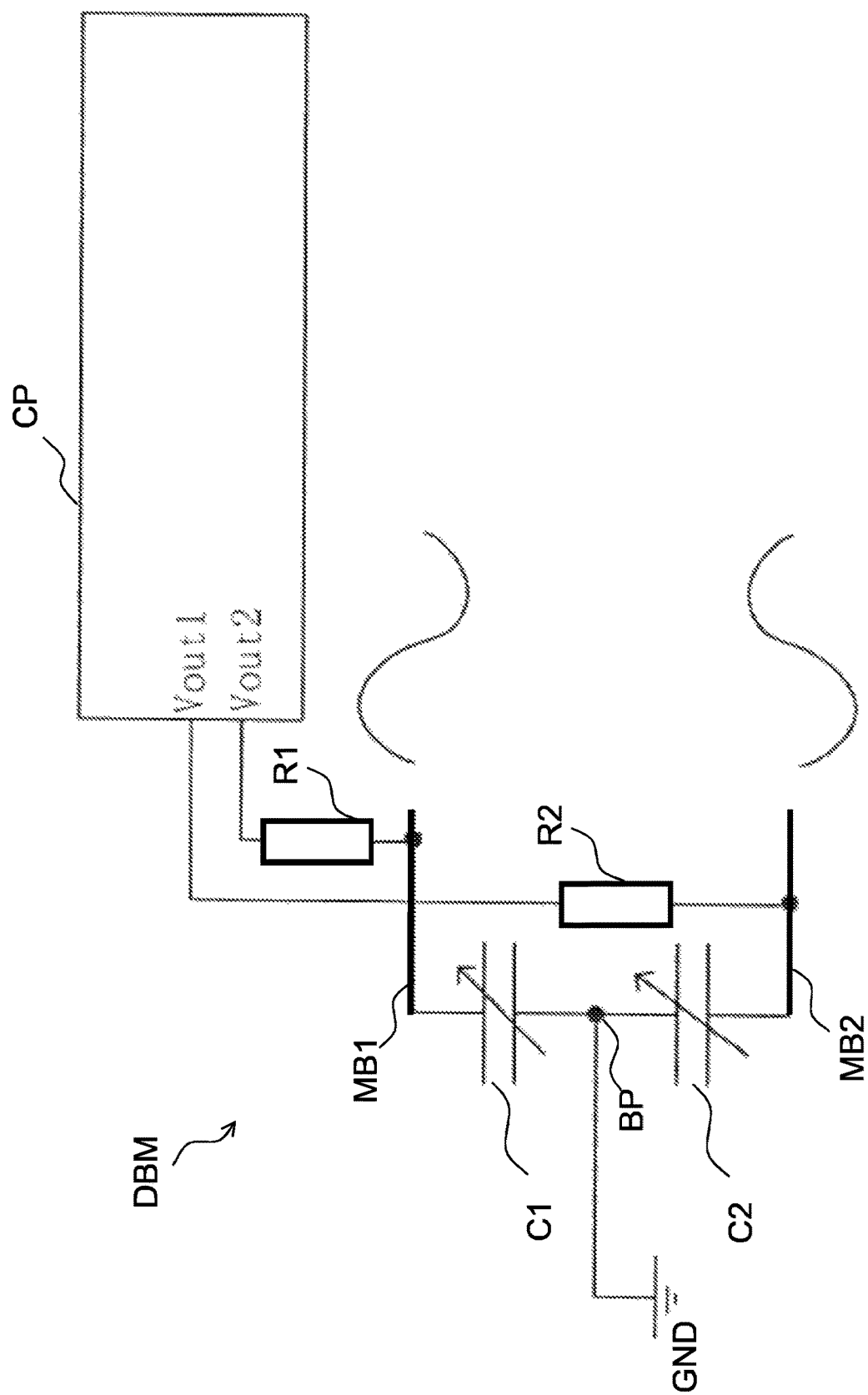
FIG. 1b shows an equivalent circuit diagram of another exemplary embodiment of a microphone circuit arrangement.

FIG. 1b shows an equivalent circuit diagram of another exemplary embodiment of a microphone circuit arrangement DBM, in particular a micro-electro-mechanical systems (MEMS) microphone circuit arrangement.

The microphone circuit arrangement DBM comprises a first membrane MB1 and a second membrane MB2. A backplate BP is arranged between the first membrane MB1 and the second membrane MB2. In this embodiment the backplate BP is for example electrically coupled to or directly connected with ground GND, in particular ac-ground.

The first membrane MB1 and the second membrane MB2 are for example each configured to be electrically coupled or directly connected to a first input port and a second input port of an amplifier, respectively. The first membrane MB1 and the backplate BP establish the electrodes of a first capacitor C1. The backplate BP and the second membrane MB2 establish the electrodes of a second capacitor C2. The first capacitor C1 and the second capacitor C2 are connected in series. The first and the second capacitors C1, C2 comprise a variable capacity value. Thus, the series connection of the first capacitor C1 and the second capacitor C2 establishes a capacitance element comprising a variable capacity value where the capacity value varies in time depending on the received sound pressure.

The microphone circuit arrangement DBM comprises a high voltage (HV) charge pump CP which provides at least a first output voltage Vout1 and a second output voltage Vout2, wherein the first output voltage Vout1 and the second output voltage Vout2 comprise the same polarity. Preferably, the HV charge pump is a double-output HV charge pump providing the first output voltage Vout1 and the second output voltage Vout2 with a positive voltage.

The backplate BP is configured to convert an acoustical signal into an electrical signal. As the first capacitor C1 and the second capacitor C2 comprise a non-ideal characteristic and asymmetry, two different bias voltages to bias the first membrane MB1 and the second membrane MB2, respectively, are desired.

The first membrane MB1 is electrically coupled to a first output node VOUT1 of the HV charge pump providing the first output voltage. Preferably the first membrane MB1 is biased by the first output voltage Vout1 via a first resistive element R1.

The second membrane MB2 is electrically coupled to a second output node VOUT2 of the HV charge pump providing the second output voltage Vout2. Preferably the second membrane MB2 is biased by the second output voltage Vout 2 via a second resistive element R2.

Figure 2:
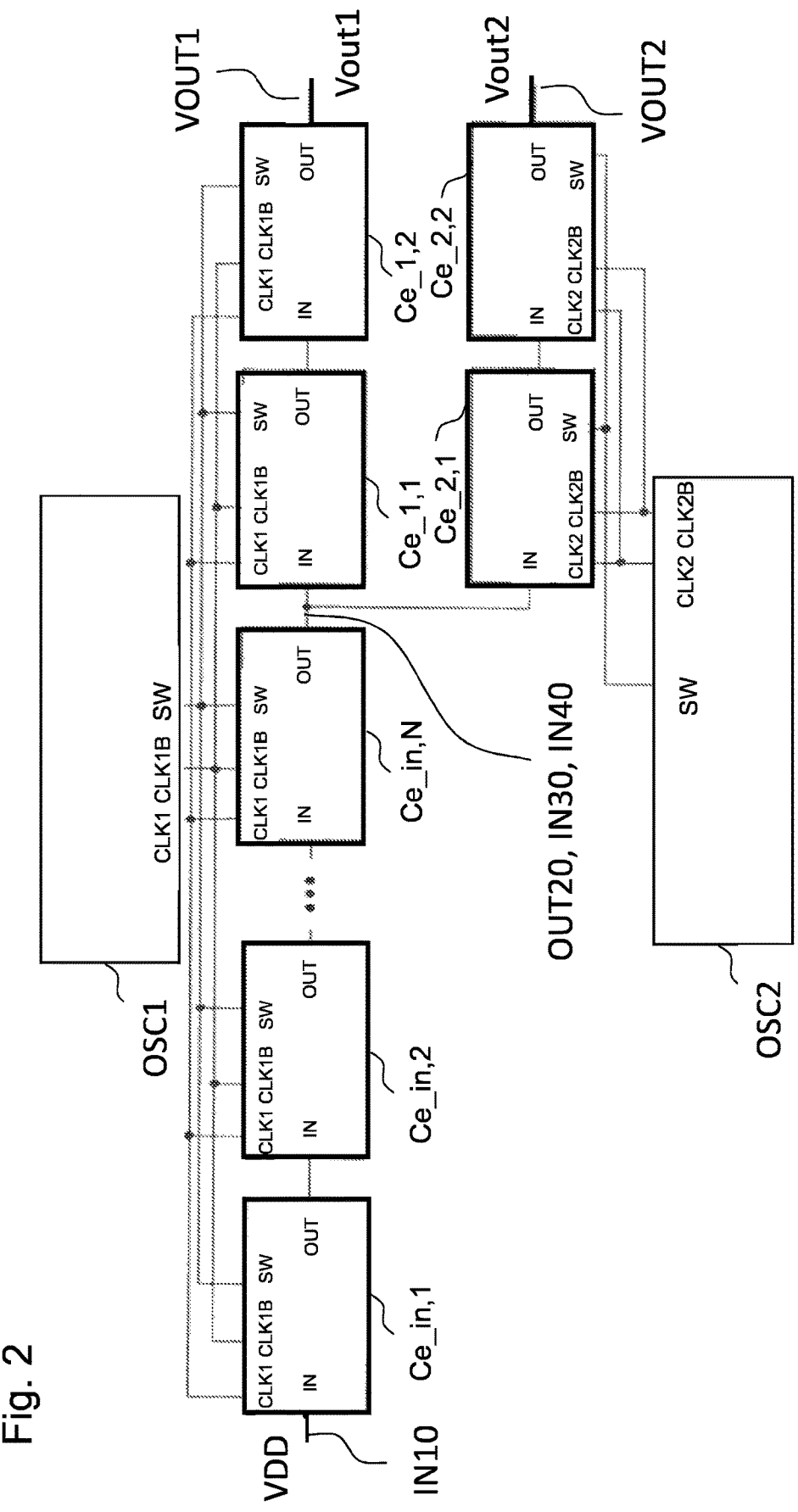
FIG. 2 shows an equivalent circuit diagram of an exemplary embodiment of a high voltage charge pump.

FIG. 2 shows an equivalent circuit diagram of an exemplary embodiment of the HV charge pump.

The HV charge pump comprises an input charge pump section ICPS, a first output charge pump section OCPS1 and a second output charge pump section OCPS2.

The input charge pump section ICPS comprises an input node IN10, an output node OUT20 and N input charge pump cells Ce_in,n, which are arranged between the input node IN10 and the output node OUT20 and where N is any positive integer≥1.

The first output charge pump section OCPS1 comprises a first input node IN30, the first output node VOUT1 and M first charge pump cells Ce_1,m, which are arranged between the first input node IN30 and the first output node VOUT1 and where M is any positive integer≥1. In the embodiment shown in FIG. 2 the number M=2.

The second output charge pump section OCPS2 comprises a second input node IN40, a second output node VOUT2 and K second charge pump cells Ce_2,k, which are arranged between the second input node IN40 and the second output node VOUT2 and where K is any positive integer≥1. In the embodiment shown in FIG. 2 the number K=2.

The input node IN10 of the input charge pump section ICPS is electrically coupled or connected to a supply voltage VDD of the microphone circuit arrangement DBM. The output node OUT20 of the input charge pump section ICPS is coupled with the first input node IN30 of the first output charge pump section OCPS1 and the second input node IN40 of the second output charge pump section OCPS2.

On the first output node VOUT1 of the first output charge pump section OCPS1 the first output voltage Vout1 for biasing the first backplate BP1 is provided, and on the second output node VOUT2 of the second charge pump output section OCPS2 the second output voltage Vout2 for biasing the second backplate BP2 is provided, wherein the second output voltage comprises the same polarity as the first output voltage. In particular the first and second output voltage are positive.

Alternatively, on the first output node VOUT1 of the first output charge pump section OCPS1 the first output voltage Vout1 for biasing the first membrane MB1 is provided, and on the second output node VOUT2 of the second charge pump output section OCPS2 the second output voltage Vout2 for biasing the second membrane MB2 is provided, wherein the second output voltage comprises the same polarity as the first output voltage. In particular the first and second output voltage are positive.

Thus, the charge pump cells Ce_in,1; . . . ; Ce_in,n; . . . ; Ce_in,N of the input charge pump section ICPS and the first charge pump cells Ce_1,1; . . . ; Ce_1,m; . . . ; Ce_1,M of the first output charge pump section OCPS1 generate the first output voltage Vout1.

The charge pump cells Ce_in,1; . . . ; Ce_in,n; . . . ; Ce_in,N N of the input charge pump section ICPS and the charge pump cells Ce_2,1; . . . ; Ce_1,k; . . . ; Ce_2,K of the second output charge pump section OCPS2 generate the second output voltage Vout2.

The charge pump cells Ce_in,n, Ce_1,m, Ce_2,k of the respective charge pump sections ICPS, OCPS1, OCPS2 are for example arranged in series and are each driven by at least two clock signals. Preferably, each charge pump cell Ce_in, n, Ce_1,m, Ce_2,k is driven by two non-overlapping clock signals.

For example, the charge pump cells Ce_in,n of the input charge pump section ICPS are each driven by a first clock signal clk1 and a second clock signal clk1B provided by a first clock generator OSC1. The charge pump cells Ce_1,m of the first output charge pump section OCPS1 are each driven by a third clock signal clk2 and a fourth clock signal clk2B generated by a second clock generator OSC2. The second charge pump cells Ce_2,k of the second output charge pump section OCPS2 are each driven by a fifth clock signal and a sixth clock signal generated by a third generator.

Optionally, as shown in FIG. 2, the first clock signal clk1 and the fifth clock signal can be the same as well as the second clock signal clk1B and the sixth clock signal can be the same. In this case the clock signals clk1, clk1B, clk2, clk2B can be provided by two clock generators.

For instance, the first clock generator OSC1 is configured to provide each of the first clock signal clk1 and the second clock signal clk1*b* with a first amplitude V1, and the second clock generator OSC2 is configured to provide each of the third clock signal clk2 and the fourth clock signal clk2B with a second amplitude V2.

Figure 3:
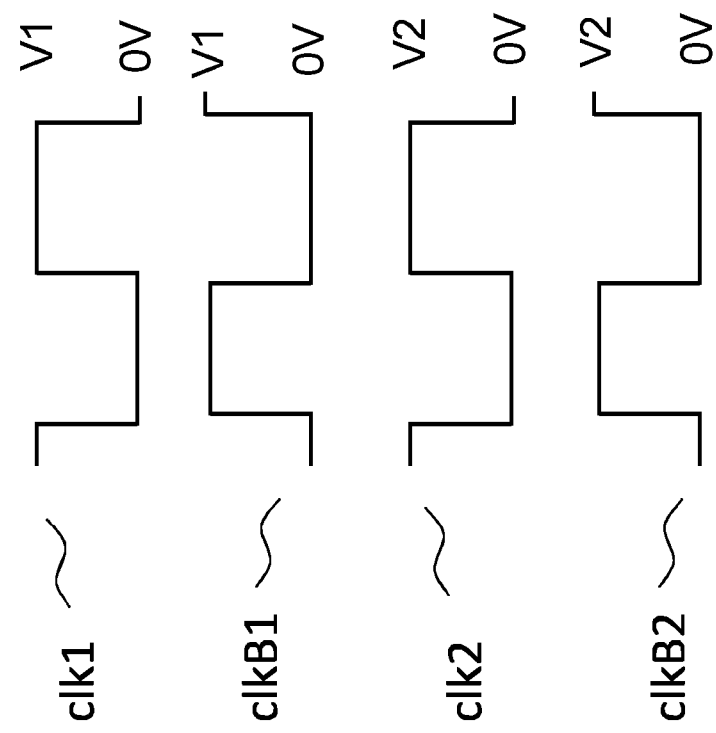
FIG. 3 shows an exemplary timing, a phase relationship and waveform of a first to fourth clock signal.

An exemplary timing, a phase relationship and waveform of the first to fourth clock signals clk1, clk1B, clk2, clk2B is shown in FIG. 3. The corresponding clock signals clk1, clk1B, clk2, clk2B of each clock generator OSC1, OSC2 comprise the same frequency but a 180° phase shift between clk1 and clk1B, and a 180° phase shift between clk2 and clk2B. The falling/rising clock edge of the first clock signal clk1 and the second clock signal clk1B never occurs at the same time but always with a tiny timing difference, i.e. non-overlapping. Also for the third and fourth clock signal the falling/rising clock edge never occurs at the same time but always with a tiny timing difference, i.e. non-overlapping.

Based on this circuit structure, the first output voltage Vout1 and the second output voltage Vout2 provided by the HV charge pump are subject to Eq. (1) and Eq. (2), respectively, $$Vout1 = VDD + (N' + M') * V1 \quad \text{Eq. (1)}$$

$$Vout2 = VDD + N'*V1 + K'*V2 \quad \text{Eq. (2)},$$

wherein VDD is the supply voltage of the HV charge pump and N', M', K' the number of acting charge pump cells in the input charge pump section ICSP, the first output charge pump section OCPS1 and the second output charge pump section OCPS2, respectively. V1 is the amplitude of the first and second clock signals clk1, clk1B and V2 is the amplitude of the third and fourth clock signals clk2, clk2B.

As can be seen from Eq. (1) and Eq. (2) the output voltages of the HV charge pump can flexibly adjusted. Firstly, by varying the amplitudes V1, V2 of the clock signals clk1, clk1B, clk2, clk2B and, secondly, by adjusting the number of currently acting charge pump cells Optionally the number of acting charge pump cells in the input charge pump section ICPS, the first output charge pump section OCPS1 and the second output charge pump section OCPS2, respectively, may vary.

For example, the HV charge pump is configured to bypass some or all charge pump cells of the charge pump sections ICPS, OCPS1, OCPS2 individually.

For instance, at least one of the charge pump cells of the input charge pump section IPCS and/or the first output charge pump section OCPS1 and/or second output charge pump section comprises OCPS2 a switch SW_T configured to force an output voltage of the charge pump cell to be equal to an input voltage of the charge pump cell.

The respective switch SW_T is controlled, for instance, by a control signal.

Figure 4:
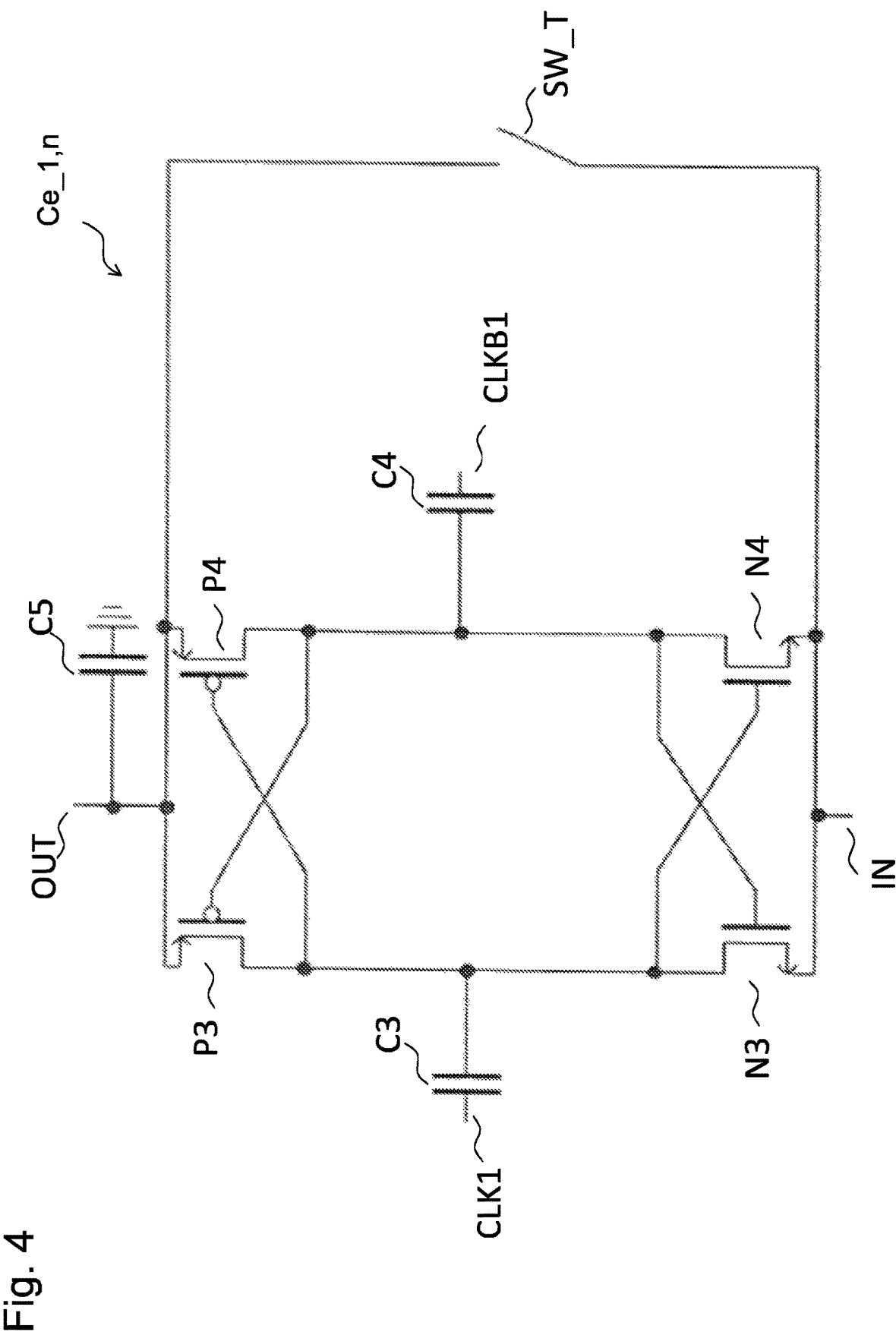
FIG. 4 shows an equivalent circuit diagram of an exemplary embodiment of one of the first charge pump cells.

FIG. 4 shows an equivalent circuit diagram of an exemplary embodiment of one of the first charge pump cells Ce_1,m.

The first charge pump cell Ce_1,m comprises a first and a second charge transfer capacitor C3, C4. Furthermore the first charge pump cell Ce_1,m comprises a first inverter and a second inverter as well as an accumulation capacitor C5.

The first charge transfer capacitor C3 has a first terminal coupled to a first output of the first clock generator OSC1 and a second terminal coupled to an input node of the first inverter. The second charge transfer capacitor C4 has a first terminal coupled to the second output of the first clock generator OSC1 and a second terminal coupled to the input node of the second inverter. The first inverter comprises an N-type field effect transistor N3 having its source connected to a supply input node IN and its drain connected to the drain of a P-type field effect transistor P3 which has its source connected to a node OUT. Similarly the second inverter comprises series-connected N-type and P-type transistors N4 and P4, respectively, connected between the output node OUT and input node IN. The first and second inverters are cross-coupled such that the input node of the first inverter is connected to the gates of the N-type transistor N4 and the P-type transistor P4 of the second inverter, and the input node of the second inverter is coupled to the gates of the N-type transistor N3 and the P-type transistor P3 of the first inverter.

The accumulation capacitor C5 has a first terminal coupled to the output node OUT and a second terminal coupled to ground GND.

Optionally the input node IN and the output node OUT are coupled to a switch SW_T. The switch SW_T may comprise a first state and a second state. For example, in the first state the switch SW_T is configured to provide short circuit connection between the input node IN and the output node OUT of the first charge pump cell Ce_1,m. In the second state the switch SW_T for example does not effect the function of the first charge pump cell Ce_1,m.

In normal operation, the switch SW_T is in the second state and an output voltage of the first charge pump cell Ce_1,m is the sum of an input voltage of the respective first charge pump cell Ce_1,m and the amplitude V1 of the first clock signal clk1.

The switch SW_T is controlled by a control signal. For instance, the switch SW_T comprises a transistor.

For instance, the input charge pump cells Ce_in,n and the first charge pump cells Ce_1,m and the second charge pump cells Ce_2,k comprise an identical circuit structure and an identical circuit dimensioning, but different clock signals are used for the first and second charge pump cells Ce_1,m, Ce_2,k.

The transfer capacitors C3, C4 comprise a capacity value, for instance, in the range of 2 pF to 5 pF. The accumulation capacitor C5 comprise a capacity value, for instance, in the range 0.5 pF to 2 pF.

The switches SW_T of the cells are for instance controlled by the clock generators OSC1, OCS2. For example, the second clock generator OCS2 controls the switches SW_T of the second charge pump cells Ce_2,k and the first clock generator OSC1 controls the switches SW_T of the input charge pump cells Ce_in,n and the first charge pump cells Ce_1,m.

If the first and the second clock signal clk1, clk1B are non-overlapping clock signals, the P-type field effect transistor P3 and the N-type field effect transistor N3 do not turn on simultaneously during clock edge, or the P-type field effect transistor P4 and the N-type field effect transistor N4 do not turn on simultaneously during clock edge. If the P-type field effect transistor P3 and the N-type field effect transistor N3 turn on simultaneously, there will be leakage current from the output node OUT of the charge pump to the input node IN resulting in the loss of the efficiency of the charge pump cell. Also, if the P-type field effect transistor P4 and N-type field effect transistor N4 turn on simultaneously, there will be leakage current from the output node OUT to the input node IN resulting in the loss of the efficiency of the first charge pump cell Ce_1,m.

The third and fourth clock signal clk2, clk2B are preferably also non-overlapping. This ensures that there is no leakage current from the output node OUT to the input node IN resulting in the loss of the efficiency of the second charge pump cell Ce_2,k.

REFERENCE NUMERALES

BP backplate
BP1 first backplate
BP2 second backplate
C1 first capacitor
C2 second capacitor
C3, C4 transfer capacitor
C5 accumulation capacitor
Ce_1,m first charge pump cell
Ce_2,k second charge pump cell
Ce_in,n input charge pump cell
clk1 first clock signal
CLK1 first output of the first clock generator
clk1B second clock signal
CLK1B second output of the second clock generator clk2 third clock signal
CLK2 first output of the second clock generator
clk2B fourth clock signal
CLK2B second output of the second clock generator
CP charge pump
DBM microphone circuit arrangement
GND ground
ICPS input charge pump section
IN input node of a charge pump cell
IN10 input node of the input charge pump section
IN30 input node of the first output charge pump section
IN40 input node of the second output charge pump section
M membrane
MB1 first membrane
MB2 second membrane
N3, N4 N type transistor
OCPS1 first output charge pump section
OCPS2 second output charge pump section
OSC1 first clock generator
OSC2 second clock generator
OUT output node of a charge pump cell
OUT20 output node of the input charge pump section
P3, P4 P type transistor
R1 first resistor
R2 second resistor
SW switch output
sw switch signal
SW_T switch
VDD supply voltage
VOUT1 output node of the first output charge pump section
Vout1 first output voltage
VOUT2 output node of the second output charge pump section
Vout2 second output voltage

The invention claimed is:

1. A microphone circuit arrangement (DBM) comprising a microphone and a charge pump (GP) wherein
the charge pump includes an input charge pump section, a first output charge pump section and a second output charge pump section, wherein
the input charge pump section includes an input node, an output node and N input charge pump cells, which are arranged between the input node and the output node, and where N is any positive integer ≥1,
the first output charge pump section includes a first input node, a first output node and M first charge pump cells, which are arranged between the first input node and the first output node, and where M is any positive integer ≥1,
the second output charge pump section includes a second input node, a second output node and K second charge pump cells, which are arranged between the second input node and the second output node, and where K is any positive integer ≥1,
the output node of the input charge pump section is coupled with the first input node of the first output charge pump section and with the second input node of the second output charge pump section, and
the charge pump is configured to provide a first output voltage on the first output node and a second output voltage on the second output node, wherein the second output voltage has the same polarity as the first output voltage; and
the microphone comprises a first backplate, a second backplate and a membrane, wherein the membrane is arranged between the first backplate and the second backplate,
the first backplate and the second backplate are each configured to convert an acoustical signal into an electrical signal,
the first backplate is electrically coupled to the first output node of the charge pump, and the second backplate is electrically coupled to the second output node of the charge pump; or
the microphone comprises a first membrane, a second membrane and a backplate, wherein
the backplate is arranged between the first membrane and the second membrane,
the backplate is configured to convert an acoustical signal into an electrical signal,
the first membrane is electrically coupled to the first output node of the charge pump, and the second membrane is electrically coupled to the second output node of the charge pump.

2. The microphone circuit arrangement according to claim 1, wherein the input charge pump cells of the input charge pump section and/or the first charge pump cells of the first output charge pump section and/or the second charge pump cells of the second output charge pump section are coupled in series.

3. The microphone circuit arrangement according to claim, 1, wherein a number of active charge pump cells in the input charge pump section and/or in the first output charge pump section and/or in the second output charge pump section is adjustable, wherein an active charge pump cell is a charge pump cell which provides an output signal that is different from its input signal.

4. The microphone circuit arrangement according to claim, 1, wherein the charge pump includes at least one switch for bypassing at least one of the input charge pump cells and/or of the first charge pump cells and/or the second charge pump cells.

5. The microphone circuit arrangement according to claim 4, wherein the switch or the switches are arranged in pre-defined charge pump cells.

6. The microphone circuit according to claim 1, wherein the input charge pump cells and/or the first charge pump cells and/or the second charge pump cells are each driven by at least one clock signal, whose amplitude is adjustable.

7. The microphone circuit arrangement according claim 1, wherein the input charge pump cells and/or the first charge pump cells and/or the second charge pump cells are each driven by two non-overlapping clock signals.

8. The microphone circuit arrangement according to claim 6, wherein the input charge pump cells and the first charge pump cells are driven by a first and a second clock signal, and the second charge pump cells are driven by a third and a fourth clock signal.

9. The microphone circuit arrangement according to claim 8, wherein the first and the second clock signals include a first frequency and a first amplitude, and the third and fourth clock signals include the first frequency and a second amplitude.

10. The microphone circuit arrangement according to claim 1, wherein
the input charge pump cells and
the first charge pump cells and/or the second charge pump cells include an identical circuit structure.

11. The microphone circuit arrangement according to claim 1, wherein when the microphone comprises the first and the second backplate the first backplate is biased by the first output voltage provided on the first output node of the charge pump via a first resistive element and the second backplate is biased by the second output voltage provided on the second output node via a second resistive element, whereas when the microphone comprises the first and the second membrane the first membrane is biased by the first output voltage provided on the first output node of the charge pump via a first resistive element and the second membrane is biased by the second output voltage provided on the second output node via a second resistive element R2.

\* \* \* \* \*

UNITED STATES PATENT AND TRADEMARK OFFICE
CERTIFICATE OF CORRECTION

| | | |
|---|---|---|
| PATENT NO. | : 11,496,829 B2 | Page 1 of 1 |
| APPLICATION NO. | : 16/765497 | |
| DATED | : November 8, 2022 | |
| INVENTOR(S) | : Lei Zou et al. | |

It is certified that error appears in the above-identified patent and that said Letters Patent is hereby corrected as shown below:

On the Title Page

At the representative drawing, please delete the figure shown on the left.

In the Claims

At Column 9, Lines 38-39 (Claim 1, Lines 1-2), please delete "(DBM)" and "(GP)".

At Column 10, Line 41 (Claim 6, Line 1), please insert --arrangement-- after "microphone circuit".

At Column 11, Line 11 (Claim 11, Line 15), please delete "R2".

Signed and Sealed this
Fourth Day of April, 2023

Katherine Kelly Vidal
*Director of the United States Patent and Trademark Office*